(12) United States Patent
Uejima

(10) Patent No.: US 8,467,740 B2
(45) Date of Patent: Jun. 18, 2013

(54) HIGH-FREQUENCY MODULE

(75) Inventor: Takanori Uejima, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 231 days.

(21) Appl. No.: 13/150,347

(22) Filed: Jun. 1, 2011

(65) Prior Publication Data
US 2011/0300820 A1 Dec. 8, 2011

(30) Foreign Application Priority Data
Jun. 3, 2010 (JP) .................. 2010-127387

(51) Int. Cl.
*H04B 1/18* (2006.01)
(52) U.S. Cl.
CPC ........................ *H04B 1/18* (2013.01)
USPC ............................ 455/78; 455/82
(58) Field of Classification Search
CPC ....................................................... H04B 1/18
USPC .................. 455/73, 77, 78, 80, 82, 83, 550.1, 455/552.1, 575.1, 101, 296, 307
See application file for complete search history.

(56) References Cited

U.S. PATENT DOCUMENTS

| | | | |
|---|---|---|---|
| 7,117,235 B2 * | 10/2006 | Cannon | 708/313 |
| 2009/0003286 A1 | 1/2009 | Korden et al. | |
| 2011/0244821 A1 * | 10/2011 | Dorsey | 455/307 |
| 2013/0035045 A1 * | 2/2013 | Bremer et al. | 455/77 |

FOREIGN PATENT DOCUMENTS

| | | |
|---|---|---|
| JP | 2006-121211 A | 5/2006 |
| JP | 2007-266840 A | 10/2007 |
| JP | 2008-516494 A | 5/2008 |

* cited by examiner

*Primary Examiner* — Thanh Le
(74) *Attorney, Agent, or Firm* — Keating & Bennett, LLP

(57) ABSTRACT

A high-frequency module includes a switch IC. An antenna filter is connected to a common terminal of the switch IC and arranged adjacent to an antenna. The antenna filter is a low-pass filter whose attenuation band includes higher harmonic frequency bands of GSM1800/GSM1900 transmission signals and TDS-CDMA transmission signals. An individual-terminal filter is connected to one individual terminal of the switch IC. The individual-terminal filter is a low-pass filter whose attenuation band includes higher harmonic frequency bands of GSM850/GSM900 transmission signals.

6 Claims, 6 Drawing Sheets

HIGH-FREQUENCY MODULE

BACKGROUND OF THE INVENTION

1. Field of the Invention

The present invention relates to a high-frequency module for transmitting and receiving a plurality of communication signals having different frequency bands that includes a switch integrated circuit (IC).

2. Description of the Related Art

Various types of high-frequency modules including switch ICs have been proposed. For example, Japanese Unexamined Patent Application Publication No. 2008-516494 discloses a high-frequency module including a switch IC including six individual terminals for a single common terminal connected to an antenna. Each of the six individual terminals of the switch IC is connected to one of a transmission circuit, a reception circuit, and a transmission/reception circuit used for a plurality of communication signals having different frequency bands. In the high-frequency module configured as described above, the switch IC is driven to switch the connection between the common terminal and the individual terminals, thereby connecting the antenna to the transmission circuit, the reception circuit, or the transmission/reception circuit used for a specific communication signal.

In each transmission circuit of the known high-frequency module, a filter is provided to attenuate second and third harmonics of a communication signal, i.e., a transmission signal, having a transmission frequency generated in the previous circuit. Along with this filter, an electro-static discharge (ESD) protection circuit is provided for the high-frequency module and includes a portion that is disposed close to the antenna.

Currently, the performance of mobile communication devices having a high-frequency module mounted thereon, such as the above-described high-frequency module, needs to be improved, and it is desired that one antenna be used for many communication signals. In this case, if a filter is provided for each communication (transmission) signal, it is difficult to reduce the size of the high-frequency module.

SUMMARY OF THE INVENTION

To overcome the problems described above, preferred embodiments of the present invention provide a high-frequency module having a reduced size and including one antenna that is used for a plurality of communication signals, and a switch IC.

According to a preferred embodiment of the present invention, a high-frequency module preferably includes a switch IC that switches a connection between a common terminal to be connected to an antenna and a plurality of individual terminals, a plurality of transmission signals having different frequency bands being input into the plurality of corresponding individual terminals. An antenna filter is preferably connected to the common terminal of the switch IC, and an attenuation band of the antenna filter includes higher harmonic frequency bands of at least two of the plurality of transmission signals.

With this configuration, the antenna filter, which functions as a low-pass filter, attenuates at least some of the higher harmonics of a plurality of transmission signals supplied to the antenna via the switch IC between the switch IC and the antenna. This enables an individual-terminal filter disposed close to the individual terminals of the switch IC and provided for a plurality of transmission signals to be simplified. Additionally, by setting the values of the circuit components of the antenna filter, the antenna filter also preferably functions as a matching circuit between the antenna and the high-frequency module.

In this high-frequency module, the attenuation band of the antenna filter may preferably include third and higher harmonic frequency bands of the at least two of the plurality of transmission signals.

With this configuration, the antenna filter attenuates third and higher harmonic frequency bands. This makes it possible to simplify the configuration of the antenna filter and to prevent transmission loss between the switch IC and the antenna through which, not only transmission signals, but also reception signals pass. That is, a high-frequency module is provided which has a smaller size and a reduced transmission loss as compared to a high-frequency module in which an individual-terminal filter is provided for each of transmission signals. Further, by providing an individual-terminal filter for the individual terminals to attenuate at least second harmonic frequencies, a second harmonic having a relatively high magnitude is prevented from being input into the switch IC.

In this high-frequency module, the attenuation band of the antenna filter may preferably include at least one higher harmonic frequency band of each of the plurality of transmission signals.

With this configuration, some of the higher harmonics of all of the transmission signals input into the individual terminals of the switch IC can be attenuated in the antenna filter. This makes it possible to omit some of the components of the individual-terminal filter, so as to further reduce the size of the high-frequency module.

In this high-frequency module, the plurality of transmission signals may preferably include a first communication signal and a second communication signal, which uses a frequency band greater than a frequency band of the first communication signal, and the antenna filter may preferably be defined by a two-stage LC filter, and may preferably provide an attenuation pole between a third harmonic frequency band of the first communication signal and a second harmonic frequency band of the second communication signal.

In this high-frequency module, the antenna filter may preferably include an inductor connected between a signal line and ground.

With this configuration, the antenna filter functions, not only as a low-pass filter, but also as an ESD protection circuit and a high-pass filter. Further, the number of circuit components defining the antenna filter is increased, which makes it possible to more easily provide matching between the antenna and the high-frequency module.

In this high-frequency module, at least one of a plurality of circuit elements of the antenna filter may preferably be disposed in a multilayer body defining the high-frequency module.

With this configuration, some of the circuit elements of the antenna filter are disposed in the multilayer body, thereby making it possible to reduce the height and the size of the high-frequency module with a simple configuration as compared to a configuration in which components are mounted on the surface of the multilayer body.

According to a preferred embodiment of the present invention, at least one of higher harmonic bands of two or more transmission signals is attenuated by using a single antenna filter, thereby making is possible to reduce the size of the high-frequency module as compared to a high-frequency module in which a filter is independently provided for each transmission signal.

Various preferred embodiments of the present invention relate to circuit modules and, more particularly, to a circuit module in which a conductive partition is preferably provided on a circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
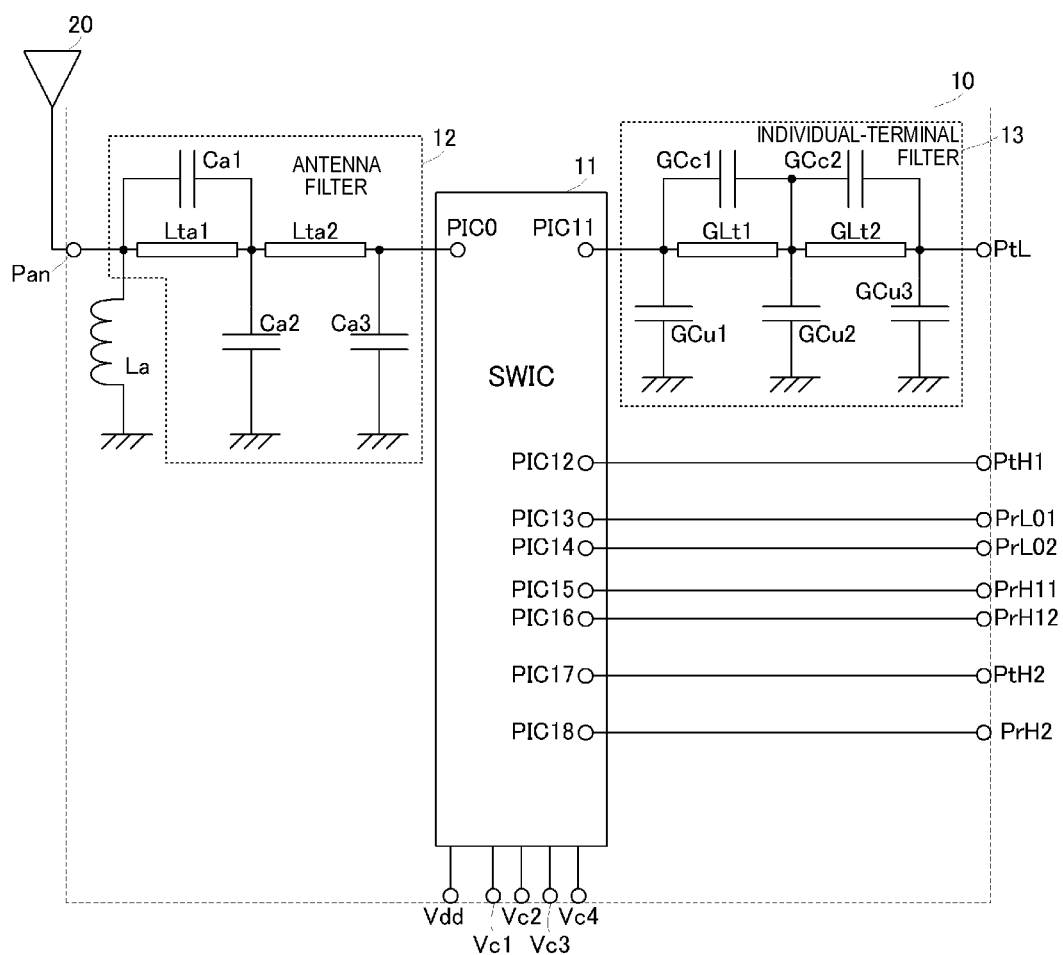
FIG. 1 is a circuit diagram illustrating the configuration of a high-frequency module according to a first preferred embodiment of the present invention.

A high-frequency module according to a first preferred embodiment of the present invention is described below with reference to the drawings. FIG. 1 is a circuit diagram illustrating the configuration of a high-frequency module 10 of the first preferred embodiment.

The high-frequency module 10 preferably includes a switch IC 11, an antenna filter 12, and an individual-terminal filter 13. The high-frequency module 10 preferably includes a multilayer body and circuit elements mounted on the top surface of the multilayer body. The switch IC 11 is preferably a surface mount IC, and is mounted on the top surface of the multilayer body. The antenna filter 12 and the individual-terminal filter 13 preferably include inductors and capacitors, for example. In this case, based on the configuration of the high-frequency module 10 and the required values of the circuit elements, many possible inductors and capacitors may preferably be defined by interlayer electrode patterns provided within the multilayer body.

The switch IC 11 preferably includes a common terminal PIC0, which functions as the common terminal of the first preferred embodiment, and individual terminals PIC11 through PIC18, which function as the individual terminals of the first preferred embodiment. The switch IC 11 is driven by application of a drive voltage Vdd, and the common terminal PIC0 is connected to one of the individual terminals PIC11 through PIC18 in accordance with combinations of high and low levels of control voltages Vc1, Vc2, Vc3, and Vc4.

The common terminal PIC0 of the switch IC 11 is connected to an antenna port Pan of the high-frequency module 10 via the antenna filter 12.

The individual terminal PIC11 of the switch IC 11 is connected to a first transmission signal input port PtL of the high-frequency module 10 via the individual-terminal filter 13. Global System for Mobile Communications (GSM)850 transmission signals or GSM900 transmission signals, for example, are input into the first transmission signal input port PtL. That is, for example, transmission signals having a signal frequency band of about 824 MHz to about 915 MHz are input into the first transmission signal input port PtL.

The individual terminal PIC12 of the switch IC 11 is directly connected to a second transmission signal input port PtH1 of the high-frequency module 10 without a filter circuit therebetween. GSM1800 transmission signals or GSM1900 transmission signals, for example, are input into the second transmission signal input port PtH1. That is, transmission signals having a signal frequency band of about 1710 MHz to about 1910 MHz (i.e., about 1.7 GHz to about 1.9 GHz), for example, are input into the second transmission signal input port PtH1.

The individual terminal PIC13 of the switch IC 11 is connected to a first reception signal output port PrL01 of the high-frequency module 10. GSM850 reception signals, for example, are output from the first reception signal output terminal PrL01.

The individual terminal PIC14 of the switch IC 11 is connected to a second reception signal output port PrL02 of the high-frequency module 10. GSM900 reception signals, for example, are output from the second reception signal output terminal PrL02.

The individual terminal PIC15 of the switch IC 11 is connected to a third reception signal output port PrH11 of the high-frequency module 10. GSM1800 reception signals, for example, are output from the third reception signal output terminal PrH11.

The individual terminal PIC16 of the switch IC 11 is connected to a fourth reception signal output port PrH12 of the high-frequency module 10. GSM1900 reception signals, for example, are output from the fourth reception signal output terminal PrH12.

The individual terminal PIC17 of the switch IC 11 is directly connected to a third transmission signal input port PtH2 of the high-frequency module 10 without a filter circuit therebetween. Time Division Synchronous (TDS)—Code Division Multiple Access (CDMA) transmission signals, for example, are input into the third transmission signal input port PtH2. That is, transmission signals having a signal frequency band of about 1880 MHz to about 2025 MHz (i.e., about 1.9 GHz to about 2.0 GHz), for example, are input into the third transmission signal input port PtH2.

The individual terminal PIC18 of the switch IC 11 is connected to a fifth reception signal output port PrH2 of the high-frequency module 10. TDS-CDMA reception signals, for example, are output from the fifth reception signal output terminal PrH2.

The antenna filter 12 preferably includes series-connected inductors Lta1 and Lta2 between the common terminal PIC0 and the antenna port Pan. A capacitor Ca1 is connected in parallel with the inductor Lta1. The node between the inductor Lta1 and the inductor Lta2 is grounded via a capacitor Ca2. The node of the inductor Lta2 located close to the common terminal PIC0 is preferably grounded via a capacitor Ca3. It is preferable that the inductors Lta1 and Lta2 and the capacitors Ca1, Ca2, and Ca3 be defined by the interlayer electrode patterns of the multilayer body, for example.

With this configuration, the antenna filter 12 defines a low-pass filter. In this case, by suitably setting the configurations of the circuit elements, such as the inductors Lta1 and Lta2 and the capacitors Ca1, Ca2, and Ca3, and by setting values of the circuit elements to desired values, a low-pass filter that preferably can attenuate second, third, and higher harmonics of GSM1800 transmission signals, GSM1900 transmission signals, and TDS-CDMA transmission signals and that can preferably allow the fundamental frequencies of GSM1800 transmission signals, GSM1900 transmission signals, and TDS-CDMA transmission signals to pass is provided. More specifically, a low-pass filter having transmission characteristics, such as those shown in FIG. 2, is provided by the antenna filter 12.

Figure 2:
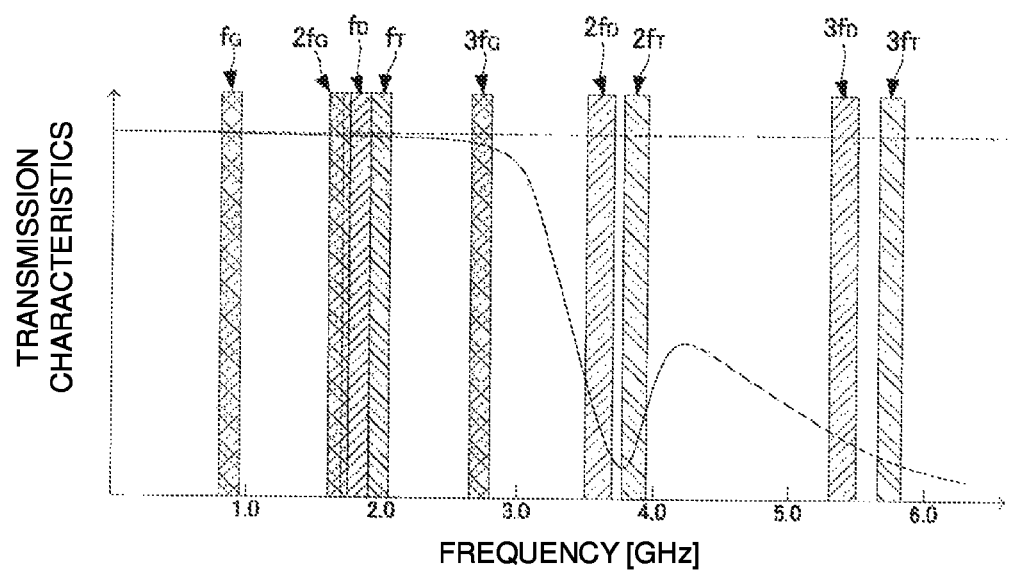
FIG. 2 is a conceptual drawing illustrating transmission characteristics of an antenna filter of the first preferred embodiment of the present invention.

FIG. 2 is a conceptual drawing illustrating the transmission characteristics of the antenna filter 12. In FIG. 2, $f_G$ is the frequency band of GSM850 transmission signals and GSM900 transmission signals, $f_D$ is the frequency band of GSM1800 transmission signals and GSM1900 transmission signals, and $f_T$ is the frequency band of TDS-CDMA transmission signals. $2f_G$ is the frequency band of the second harmonic of GSM850 transmission signals and GSM900 transmission signals, $2f_D$ is the frequency band of the second harmonic of GSM1800 transmission signals and GSM1900 transmission signals, and $2f_T$ is the frequency band of the second harmonic of TDS-CDMA transmission signals. $3f_G$ is the frequency band of the third harmonic of GSM850 transmission signals and GSM900 transmission signals, $3f_D$ is the frequency band of the third harmonic of GSM1800 transmission signals and GSM1900 transmission signals, and $3f_T$ is the frequency band of the third harmonic of TDS-CDMA transmission signals.

As shown in FIG. 2, the antenna filter 12 preferably provides an attenuation pole in the second harmonic frequency band ($2f_D$) of GSM1800 transmission signals and GSM1900 transmission signals and in the second harmonic frequency band ($2f_T$) of TDS-CDMA transmission signals, the two frequency bands being positioned close to each other. Accordingly, the fundamental frequency bands ($f_G$, $f_D$, and $f_T$) of GSM850 transmission signals, GSM900 transmission signals, GSM1800 transmission signals, GSM1900 transmission signals, and TDS-CDMA transmission signals and the second and third harmonic bands ($2f_G$ and $3f_G$) of GSM850 transmission signals and GSM900 transmission signals are included in the pass band, and the second and third harmonic bands ($2f_D$, $3f_D$, $2f_T$, and $3f_T$) of GSM1800 transmission signals, GSM1900 transmission signals, and TDS-CDMA transmission signals are included in the attenuation band. As a result, the antenna filter 12 can effectively attenuate the second and third harmonics ($2f_D$, $3f_D$, $2f_T$, and $3f_T$) of GSM1800 transmission signals, GSM1900 transmission signals, and TDS-CDMA transmission signals. It is also possible to simultaneously attenuate harmonics higher than the third harmonic of the transmission signals, although details thereof are not shown.

The antenna port Pan of the antenna filter 12 is preferably grounded via an ESD element La, which preferably includes an inductor. The ESD element La enables a surge voltage output from an antenna 20 to be grounded, thereby improving the reliability of the high-frequency module 10. In addition, since the ESD element La preferably includes an inductor disposed between a signal line and the ground, the ESD element La functions as a high-pass filter, which makes it possible to more flexibly set desired transmission characteristics of the antenna 20.

The individual-terminal filter 13 preferably includes inductors GLt1 and GLt2 connected in series between the individual terminal PIC11 and the first transmission signal input port PtL. Capacitors GCc1 and GCc2 are connected in parallel with the inductors GLt1 and GLt2, respectively. The node of the inductor GLt1 close to the individual terminal PIC11 is grounded via a capacitor GCu1. The node between the inductors GLt1 and GLt2 is grounded via a capacitor GCu2. The node of the inductor GLt2 close to the first signal input port PtL is grounded via a capacitor GCu3. It is preferable that the inductors GLt1 and GLt2 and the capacitors GCc1, GCc2, GCu1, GCu2, and GCu3 be defined by the interlayer electrode patterns of the multilayer body.

With this configuration, the individual-terminal filter 13 preferably functions as a low-pass filter. In this case, by setting the configurations of the circuit elements, such as the inductors GLt1 and GLt2 and the capacitors GCc1, GCc2, GCu1, GCu2, and GCu3, and by setting values of the circuit elements to desired values, it is possible to provide a low-pass filter that can attenuate second, third, and higher harmonics of GSM850 transmission signals and GSM900 transmission signals and that can allow the fundamental frequencies of GSM850 transmission signals and GSM900 transmission signals to pass. Thus, higher harmonics of GSM850 transmission signals and GSM900 transmission signals input through the first transmission signal input port PtL are cut off, and only the fundamental frequencies of GSM850 transmission signals and GSM900 transmission signals are input into the individual terminal PIC11 of the switch IC 11.

No filters other than the individual-terminal filter 13 are provided for a transmission circuit of the switch IC 11 in which the individual terminals are provided.

With this configuration, higher harmonics of GSM1800 transmission signals, GSM1900 transmission signals, and TDS-CDMA transmission signals are preferably attenuated by the antenna filter 12, and higher harmonics of GSM850 transmission signals and GSM900 transmission signals are preferably attenuated by the individual-terminal filter 13. Thus, higher harmonics of any of a plurality of communication signals are prevented from being transmitted from the antenna 20 via the high-frequency module 10.

Additionally, with this configuration, unlike known high-frequency modules, it is not necessary to provide a filter for each of the individual terminals of the switch IC 11. The antenna filter 12 alone can compensate for the functions of such filters for a plurality of transmission signals, thereby making it possible to reduce the size of the high-frequency module 10.

Further, since the antenna filter 12 preferably includes the inductors Lta1 and Lta2 connected in series between the common terminal PIC0 and the antenna port Pan, the impedance, which is normally a capacitive impedance, of the switch IC 11 as viewed from the antenna 20 (antenna port Pan) can preferably be shifted to an inductive impedance. Thus, impedance matching is provided between the antenna 20 and the switch IC 11 without providing a separate matching circuit, which makes it possible to further reduce the size of the high-frequency module 10.

Figure 3:
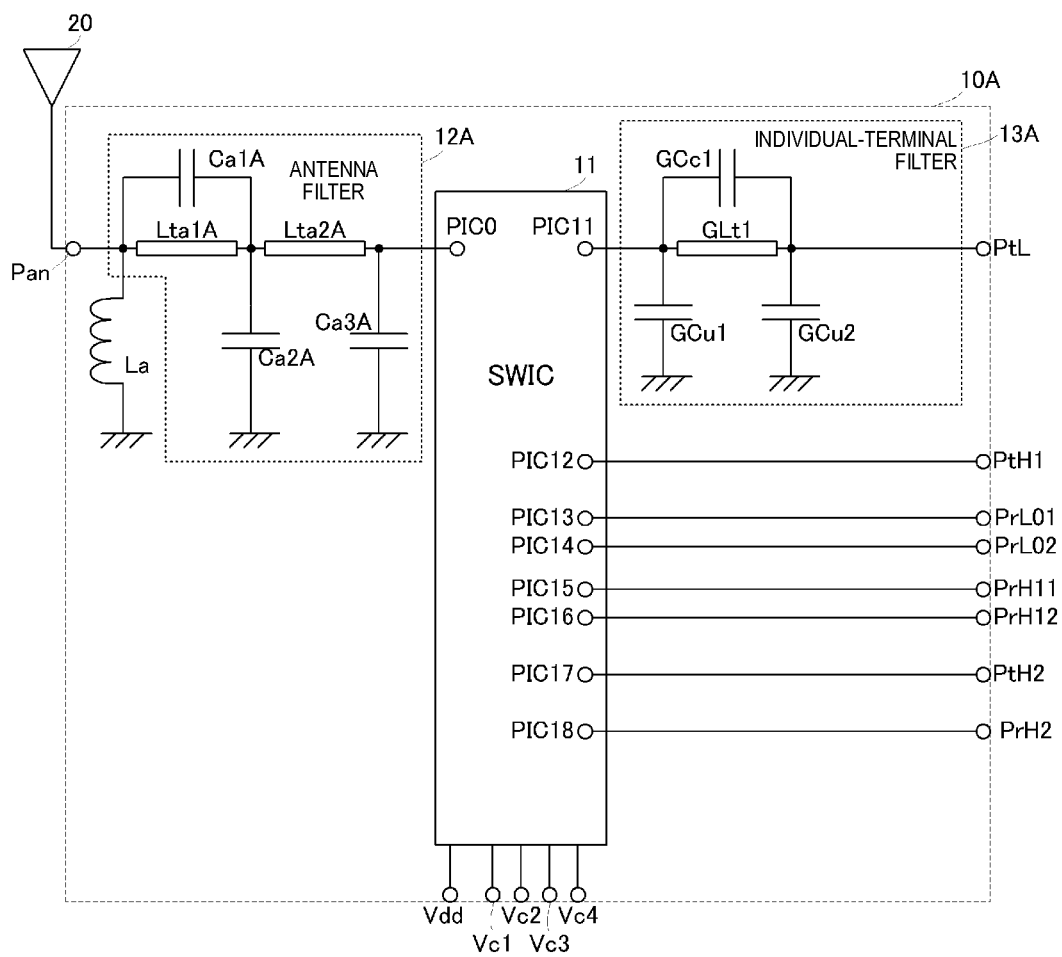
FIG. 3 is a circuit diagram illustrating the configuration of a high-frequency module according to a second preferred embodiment of the present invention.

A high-frequency module according to a second preferred embodiment of the present invention is described below with reference to the drawings. FIG. 3 is a circuit diagram illustrating the configuration of a high-frequency module 10A of the second preferred embodiment. The high-frequency module 10A is different from the high-frequency module 10 of the first preferred embodiment preferably only in the configurations of an antenna filter 12A and an individual-terminal filter 13A. The configurations of the other components are substantially the same as those of the high-frequency module 10. Accordingly, a description is provided of only the specific configurations of the antenna filter 12A and the individual-terminal filter 13A.

The configurations of the circuit elements of the antenna filter 12A are substantially the same as those of the antenna filter 12. However, the values of the circuit elements are preferably different from those of the antenna filter 12 so as to achieve the transmission characteristics shown in FIG. 4.

Figure 4:
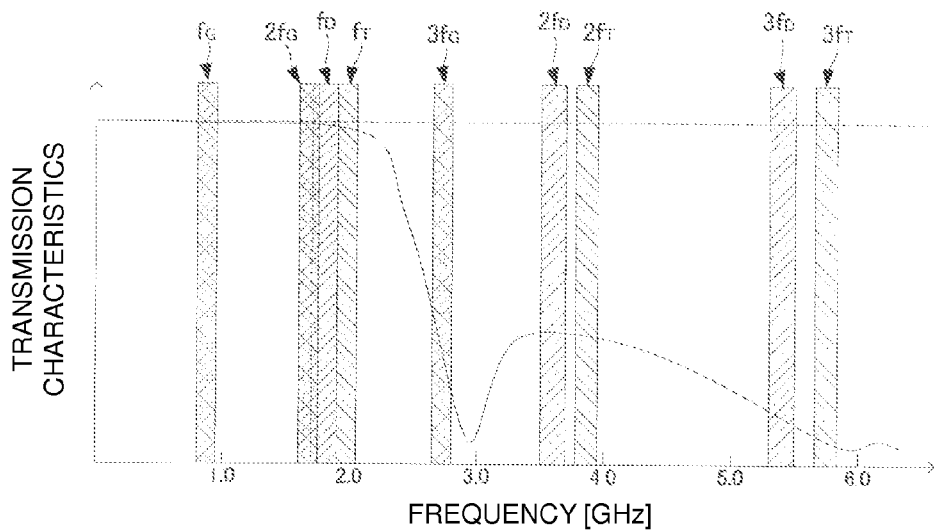
FIG. 4 is a conceptual drawing illustrating transmission characteristics of an antenna filter of the second preferred embodiment of the present invention.

More specifically, the inductors Lta1 and Lta2 of the first preferred embodiment are preferably substituted with inductors Lta1A and Lta2A, respectively, and the capacitors Ca1, Ca2, and Ca3 of the first preferred embodiment are preferably substituted with capacitors Ca1A, Ca2A, and Ca3A, respectively. In the antenna filter 12A configured as described above, the values of the circuit elements are preferably set so as to achieve the characteristics shown in FIG. 4. FIG. 4 is a conceptual drawing illustrating the transmission characteristics of the antenna filter 12A. In FIG. 4, $f_G$, $f^P$, $f_T$, $2f_G$, $2f_D$, $2f_T$, $3f_G$, $3f_D$, and $3f_T$ are the same frequency bands as those shown in FIG. 2.

As shown in FIG. 4, the antenna filter 12A preferably provides an attenuation band between the third harmonic band ($3f_G$) of GSM850 and GSM900 transmission signals and the second harmonic band ($2f_D$) of GSM1800 and GSM1900 transmission signals. With this configuration, the antenna filter 12A can attenuate not only higher harmonics of the GSM1800 and GSM1900 transmission signals, but also the third and higher harmonics of the GSM850 and GSM900 transmission signals.

The individual-terminal filter 13A has a configuration in which the inductors GLt2 and the capacitors GCc2 and GCc3 are preferably omitted from the configuration of the individual-terminal filter 13 of the first preferred embodiment. Those circuit elements are used to increase the attenuation of third harmonic band ($3f_G$) of the GSM850 and GSM900 transmission signals. This makes it possible for the individual-terminal filter 13A to further attenuate the second harmonic band ($2f_G$) of the GSM850 and GSM900 transmission signals. In this case, the individual-terminal filter 13A has a reduced number of components defining the circuits, thereby further reducing the size of the high-frequency module 10A.

With the configuration of the second preferred embodiment, it is possible to provide a high-frequency module that can effectively prevent higher harmonics of a plurality of communication signals (transmission signals) from being transmitted from an antenna while further reducing the number of components defining the circuits as compared to the first preferred embodiment.

Figure 5:
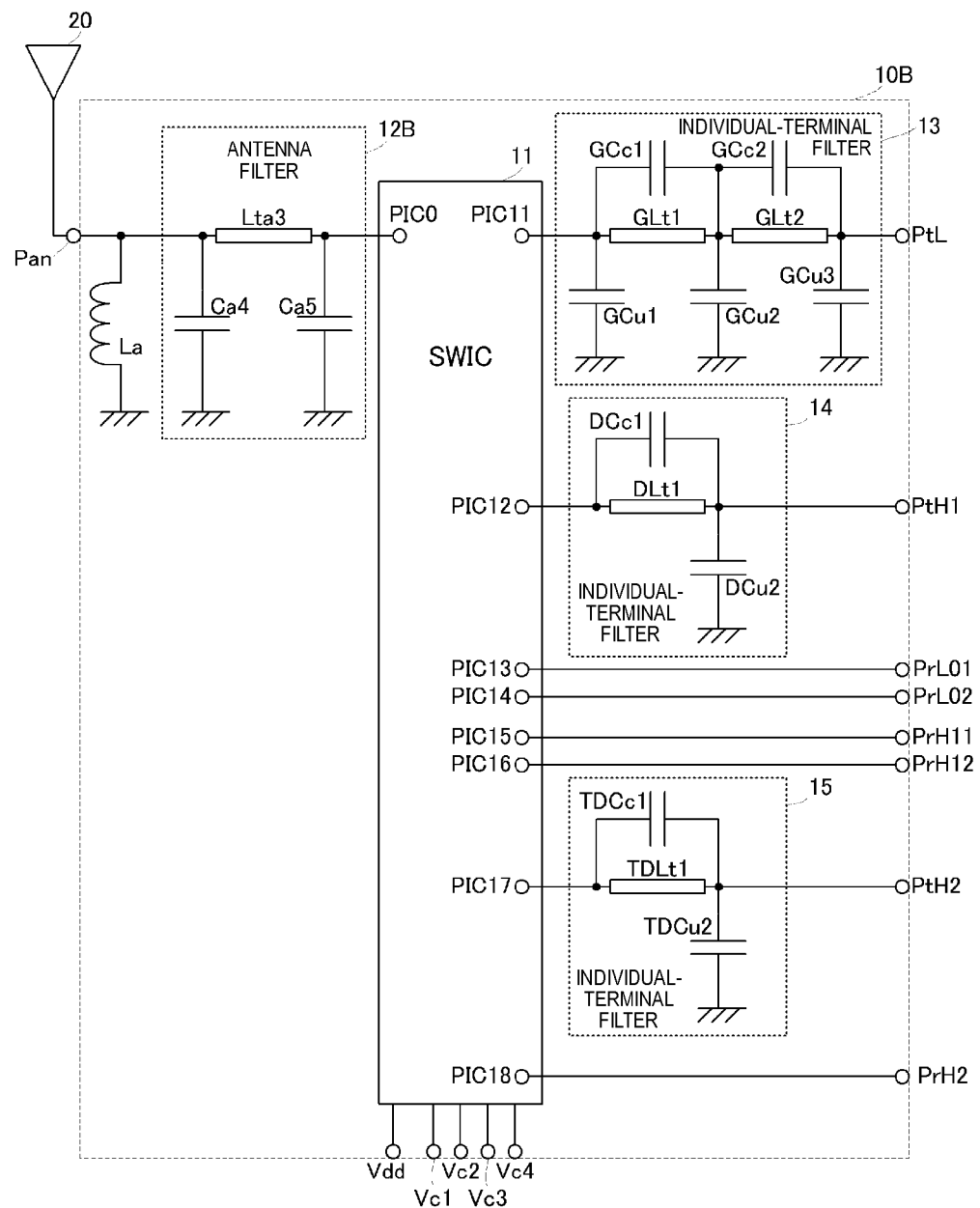
FIG. 5 is a circuit diagram illustrating the configuration of a high-frequency module according to a third preferred embodiment of the present invention.

A high-frequency module of a third preferred embodiment of the present invention is described below with reference to the drawings. FIG. 5 is a circuit diagram illustrating the configuration of a high-frequency module 10B of the third preferred embodiment. The high-frequency module 10B of the third preferred embodiment is different from the high-frequency module 10 of the first preferred embodiment in the configuration of an antenna filter 12B and in a configuration in which individual-terminal filters 14 and 15 are connected to the individual terminals PIC12 and PIC17, respectively. The configurations of the other components of the high-frequency module 10B preferably are substantially the same as those of the high-frequency module 10. Accordingly, a description is provided of only the specific configurations of the antenna filter 12B and the individual-terminal filters 14 and 15.

Figure 6:
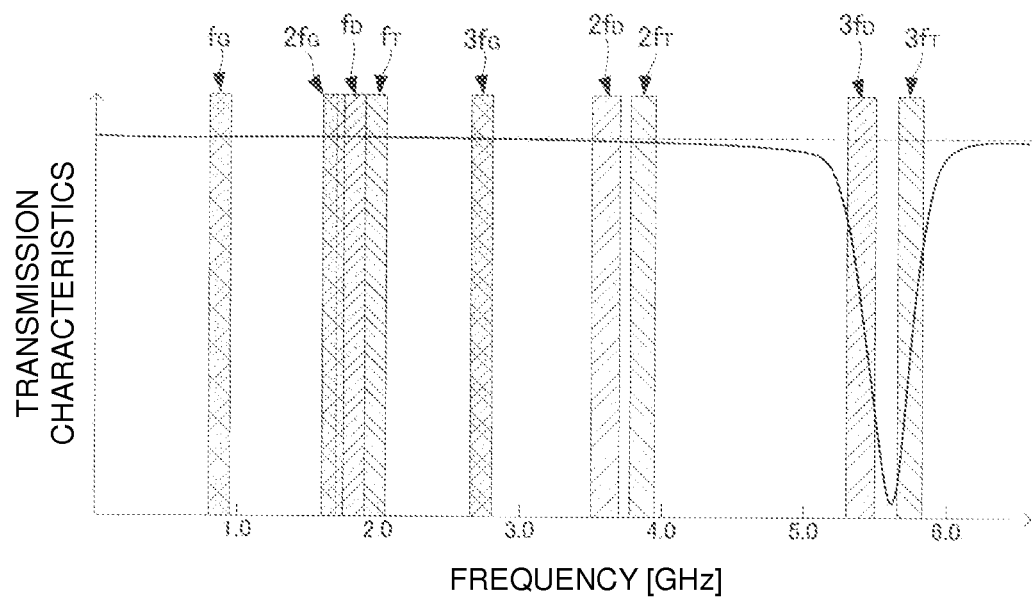
FIG. 6 is a conceptual drawing illustrating transmission characteristics of an antenna filter of the third preferred embodiment of the present invention.

In the antenna filter 12B, only a single inductor Lta3 is preferably connected between the common terminal PIC0 and the antenna port Pan. The node of the inductor Lta3 close to the antenna port Pan is grounded via a capacitor Ca4. The node of the inductor Lta3 close to the common terminal PIC0 is grounded via a capacitor Ca5. With this configuration, the antenna filter 12B defines a notch filter. In this case, the antenna filter 12B preferably provides an attenuation pole in the third harmonic frequency band ($3f_D$) of GSM1800 transmission signals and GSM1900 transmission signals and in the third harmonic frequency band ($3f_T$) of TDS-CDMA transmission signals, the two bands being positioned close to each other. In FIG. 6, $f_G$, $f^P$, $f_T$, $2f_G$, $2f_D$, $2f_T$, $3f_G$, $3f_D$, and $3f_T$ are the same frequency bands as those shown in FIGS. 2 and 4.

As shown in FIG. 6, the antenna filter 12B can preferably attenuate third harmonic bands of the GSM1800 transmission signals and GSM1900 transmission signals and the TDS-CDMA transmission signals.

The individual-terminal filter 14 is connected between the individual terminal PIC12 and the second transmission signal input port PtH1. The individual-terminal filter 14 preferably includes an inductor DLt1 connected between the individual terminal PIC12 and the second transmission signal input port PtH1. A capacitor DCc1 is connected in parallel with the inductor DLt1. The node of the inductor DLt1 close to the second transmission input port PtH1 is grounded via a capacitor DCu2. It is also preferable that the inductor DLt1 and the capacitors DCc1 and DCu2 be defined by the interlayer electrode patterns of the multilayer body.

In the individual-terminal filter 14, the values of the circuit elements are preferably set so as to allow the individual-terminal filter 14 to define a low-pass filter that can attenuate the second harmonic band ($2f_D$) of GSM1800 transmission signals and GSM1900 transmission signals.

The individual filter 15 is connected between the individual terminal PIC17 and the third transmission signal input port PtH2. The individual filter 15 preferably includes an inductor TDLt1 connected between the individual terminal PIC17 and the third transmission signal input port PtH2. A capacitor TDCc1 is connected in parallel with the inductor TDLt1. The node of the inductor TDLt1 close to the third transmission signal input port PtH2 is grounded via a capacitor TDCu2. It is also preferable that the inductor TDLt1 and the capacitors TDCc1 and TDCu2 be defined by the interlayer electrode patterns of the multilayer body.

In the individual-terminal filter 15, the values of the circuit elements are preferably set so as to allow the individual-terminal filter 15 to function as a low-pass filter that can attenuate the second harmonic band ($2f_T$) of TDS-CDMA transmission signals.

With the configuration of the third preferred embodiment, it is also possible to provide a high-frequency module that prevents higher harmonics of a plurality of communication signals (transmission signals) from being transmitted from an antenna. In this case, the number of components defining the circuits as the overall high-frequency module 10B is greater than the first preferred embodiment. However, the individual-terminal filters 14 and 15 preferably function as simple low-pass filters that can attenuate second and higher harmonics, and the number of components defining the circuits of the antenna filter 12B is less than that of the first or second preferred embodiment, thereby making it possible to reduce the size of the high-frequency module 10B as compared to known high-frequency modules.

With the configuration of the third preferred embodiment, it is possible to reduce the number of circuit components of the switch IC 11 that are inserted into signal lines provided for the antenna 20 through which reception signals are also transmitted, thereby preventing transmission loss between the switch IC 11 and the antenna 20.

In the above-described preferred embodiments of the present invention, a description has been provided of high-frequency modules used for GSM850 transmission signals, GSM900 transmission signals, GSM1800 transmission signals, GSM1900 transmission signals, and TDS-CDMA transmission signals. However, the configurations of the above-described preferred embodiments may be used for a plurality of communication signals having a relationship of frequency bands similar to that of the above-described types of signals. Additionally, although in the foregoing preferred embodiments, three transmission signal input ports are provided, any suitable number of transmission signal input ports may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency module comprising:
a switch integrated circuit arranged to switch a connection between a common terminal to be connected to an antenna and a plurality of individual terminals, a plurality of transmission signals having different frequency bands being input into corresponding ones of the plurality of individual terminals; wherein
an antenna filter is connected to the common terminal of the switch integrated circuit; and
an attenuation band of the antenna filter includes higher harmonic frequency bands of at least two of the plurality of transmission signals.

2. The high-frequency module according to claim 1, wherein the attenuation band of the antenna filter includes third and higher harmonic frequency bands of the at least two of the plurality of transmission signals.

3. The high-frequency module according to claim 1, wherein the attenuation band of the antenna filter includes at least one higher harmonic frequency band of each of the plurality of transmission signals.

4. The high-frequency module according to claim 3, wherein the plurality of transmission signals include a first communication signal and a second communication signal that uses a frequency band greater than a frequency band of the first communication signal, and the antenna filter is a two-stage LC filter and provides an attenuation pole between a third harmonic frequency band of the first communication signal and a second harmonic frequency band of the second communication signal.

5. The high-frequency module according to claim 1, wherein the antenna filter includes an inductor connected between a signal line and ground.

6. The high-frequency module according to claim 1, wherein at least one of a plurality of circuit elements of the antenna filter is provided within a multilayer body defining the high-frequency module.

* * * * *